United States Patent
Frutschi

(10) Patent No.: US 6,199,363 B1
(45) Date of Patent: Mar. 13, 2001

(54) METHOD FOR OPERATING A GAS TURBOGENERATOR SET

(75) Inventor: Hans Ulrich Frutschi, Riniken (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/210,740

(22) Filed: Dec. 15, 1998

(30) Foreign Application Priority Data

Dec. 18, 1997 (EP) .............................. 97 810 999

(51) Int. Cl.$^7$ .................................................. F02G 3/00
(52) U.S. Cl. ................... 60/39.05; 60/39.511; 60/39.55
(58) Field of Search ...................... 60/39.05, 39.07, 60/39.17, 39.161, 39.511, 39.54, 39.55

(56) References Cited

U.S. PATENT DOCUMENTS

| 3,895,488 | * | 7/1975 | Koch | .................... | 60/39.511 |
| 4,866,928 | * | 9/1989 | Raiko | .................... | 60/39.05 |
| 5,628,183 | | 5/1997 | Rice . | | |
| 5,644,911 | * | 7/1997 | Huber | .................... | 60/39.05 |

FOREIGN PATENT DOCUMENTS

| 0275121A2 | 7/1988 | (EP) . |
| 0620362A1 | 10/1994 | (EP) . |
| 0789134A2 | 8/1997 | (EP) . |
| 0795685A1 | 9/1997 | (EP) . |
| 1007140 | 5/1952 | (FR) . |

OTHER PUBLICATIONS

"Gas turbines grab wider share of power generation duties", J. Makansi, Editor, Generation Technology,, Mar. 1990, pp. 40–44.

* cited by examiner

*Primary Examiner*—Charles G. Freay
(74) *Attorney, Agent, or Firm*—Burns, Doane, Swecker & Mathis, L.L.P.

(57) ABSTRACT

In a method for operating a gas turbogenerator set, an exhaust gas stream (13) from the last turbine (5) is divided at least into two part streams (14, 15) routed in parallel. The first part stream (14) flows through a recuperator (26), and the second part stream (15) flows through a steam generator (27). The steam quantity (16) obtained from the steam generator (27) is introduced at a suitable point into combustion air (2, 27) used for operating a combustion chamber (2) belonging to the gas turbogenerator set. The exhaust gases from the turbine are consequently optimally cooled to good effect, this resulting in maximized efficiency.

3 Claims, 1 Drawing Sheet

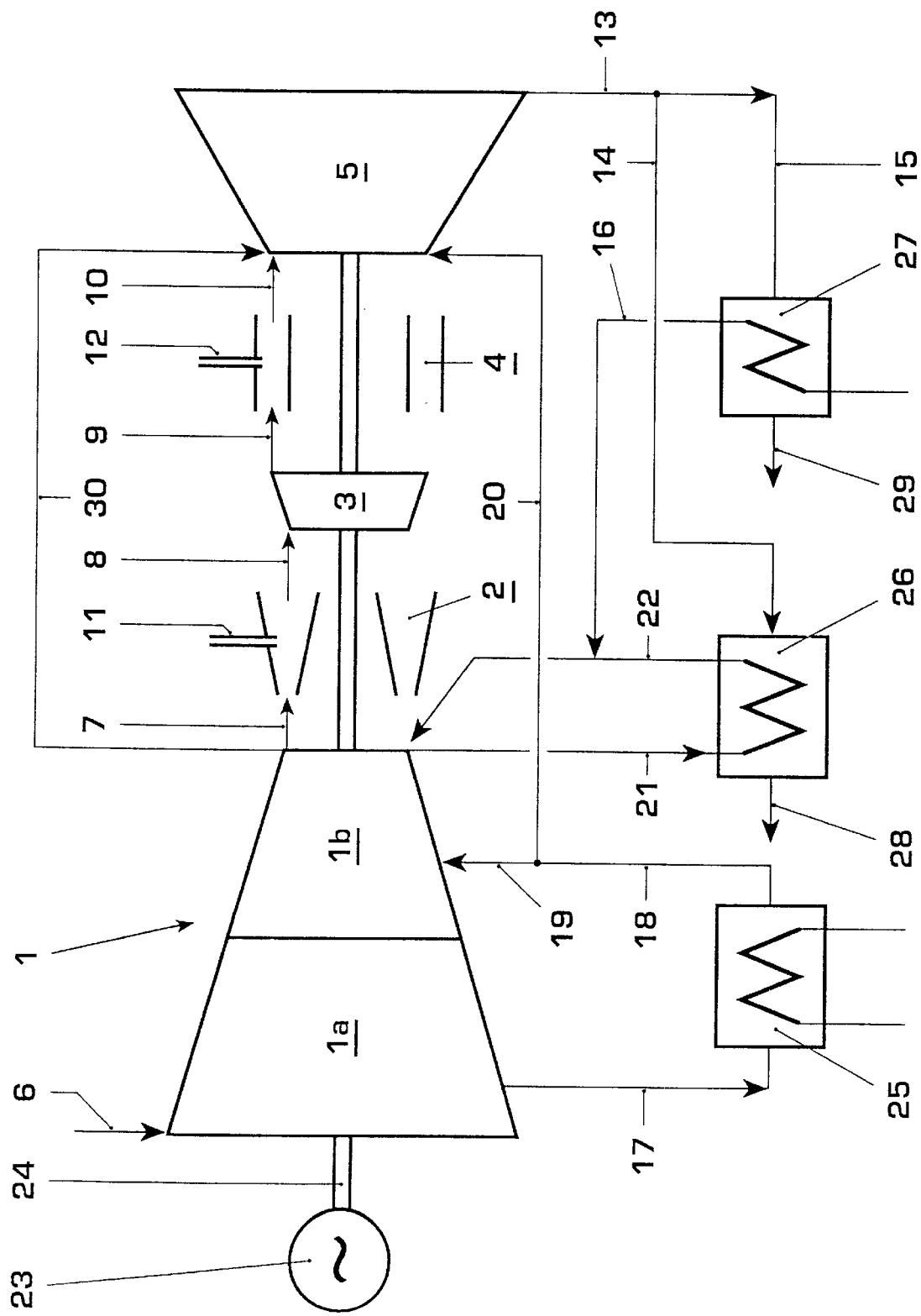

METHOD FOR OPERATING A GAS TURBOGENERATOR SET

FIELD OF THE INVENTION

The invention relates to a method for operating a gas turbogenerator set.

BACKGROUND OF THE INVENTION

In a gas turbogenerator set of the prior art, with a downstream recuperator for utilizing the heat of the exhaust gases from a turbine belonging to the gas turbogenerator set, it can generally be found that the heat yield from the still relatively hot exhaust gases is deficient, with the result that flue gases, the temperature of which may well still amount to 250° C., are discharged. This situation is aggravated in sequentially fired gas turbogenerator sets, since, in these, only about 60% of the available compressed air can be passed through the recuperator. By contrast, the recuperator is subjected to exhaust gas to the extent of about 103%, so that it can easily be seen from this that only some of the heat potential of these exhaust gases can be utilized. In order to seek a remedy for this, it has become known to place a second recuperator downstream of the first: by means of this measure, the remaining heat potential of the exhaust gases is to be utilized even further here, preferably by attempts to provide a steam quantity which is then introduced into a steam turbine. However, high-grade steam cannot be provided in this way, so that such a measure results per se in a high loss of exergy.

SUMMARY OF THE INVENTION

The object of the invention is to achieve a maximization of efficiency in the method of the type initially mentioned.

This is achieved, according to the invention, by connecting a steam generator in parallel with a recuperator on the exhaust gas side. The steam generator utilizes for steam generation the exhaust gas stream which is caused by the cooling air streams and which cannot be cooled in the recuperator, the generated steam being introduced preferably downstream of the secondary flow path of the recuperator.

The essential advantage of the invention is to be seen in that the exhaust gases from the turbine are optimally cooled to a good effect, this resulting in maximum efficiency.

The method achieves its greatest efficiency when it is combined with approximately isothermal compression in the compressor unit.

Advantageous and expedient developments of the solution according to the invention for achieving the object are defined in the further dependent claims.

An exemplary embodiment of the invention is explained in more detail below with reference to the drawing. All the elements not necessary for an immediate understanding of the invention are omitted. The direction of flow of the media is indicated by arrows.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawing, wherein the single figure shows a circuit of a sequentially fired gas turbogenerator set, with a recuperator, with a steam generator connected in parallel with this recuperator, and with means for approximately isothermal compression.

DETAILED DESCRIPTION OF THE INVENTION

Referring now to the drawing, the figure shows a gas turbogenerator set which, so as to initiate the process, has a compressor unit 1, in which the compression of the intake air 6 takes place. The air 7 thus compressed flows, after intermediate treatment described in more detail further below, into a first combustion chamber, high pressure combustion chamber, HP combustion chamber 2, in which the compressed air 7 is treated by means of a fuel 11 so as to become hot gases 8. A first turbine, high pressure turbine, HP turbine 3, in which the hot gases 8 provided in the HP combustion chamber 2 experience partial expansion, operates downstream of this HP combustion chamber 2. This partial expansion is characterized in that the partially expanded hot gases 9 flowing off from it still have a relatively high temperature of the order of magnitude of 1000° C. and above. The HP turbine 3 mentioned accordingly consists of only a few moving blade stages, preferably 1 to 3 stages. A second combustion chamber, low pressure combustion chamber, LP combustion chamber 4, which is operated on an auto-ignition principle, comes into action downstream of this HP turbine 3. This LP combustion chamber 4 has essentially the form of an annular through-flow duct, in which preferably a gaseous fuel 12 is injected. When the partially expanded hot gases 9 from the HP turbine 3 are at a temperature of the temperature level mentioned, autoignition of the injected fuel 12 takes place in the LP combustion chamber 4. This LP combustion chamber 4 has flow aids, not illustrated, which bring about a stabilizing backflow in the region of the flame front in order to ensure reliable combustion operation. The partially expanded hot gases are thereafter treated again in the LP combustion chamber 4 so as to become full-grade hot gases 10, the temperature of which corresponds approximately to that of the HP combustion chamber 2. In principle, the temperatures of the hot gases 8, 10 are not directly limited; instead, this limit is primarily predetermined by the turbine to be acted upon and its machine elements. The hot gases 10 then act upon a second turbine, low pressure turbine, LP turbine 5, in which final expansion appropriate to a gas turbine first takes place. The caloric remanence potential of the exhaust gases 13 is then employed for other purposes which are explained further below. A generator 23 ensures the generation of current from the work output of the two turbines 3, 5. An essential feature of the gas turbogenerator set shown is the unitary mounting of all the turbomachines 1, 3, 5 on a continuous shaft 24 which is supported preferably on two bearings not shown. The two combustion chambers 2, 4 occupy the intermediate space between the two turbines 3, 5, the HP combustion chamber 2 being designed preferably as an annular combustion chamber and, in terms of arrangement, being essentially superposed on the compressor unit 1, in such a way that this measure contributes appreciably to making the gas turbogenerator set a more compact unit. This possibility cannot be implemented to the same extent with regard to the LP combustion chamber 4 for reasons of flow; it should be said here, nevertheless, that the last-mentioned combustion chamber is very short, so that the sought-after aim of providing a compact gas turbogenerator set is definitely achieved. As regards the further design of such a gas turbogenerator set, reference is made to. U.S. Pat. Nos. 5,577,378 and 5,454,220

The compressor unit 1 consists of at least two part compressors 1a, 1b. The partially compressed air 17 flows out of the part compressor 1a through an intermediate cooler 25, in order subsequently to flow back, as cooled partially compressed air 18, into the second part compressor 1b, in which final compression takes place. Before entry into the part compressor 1b, one part 20 of this cooled partially compressed air is branched off and is used as cooling air for those assemblies of the gas turbogenerator set which are subjected to high thermal load; here, this cooling air 20 is used to cool the LP turbine 5. The other part 19 flows into the compressor unit 1 for further compression. At the end of compression, a further part 30 of air may, if required, be branched off for cooling purposes, here likewise to cool the LP turbine 5, as is evident from the figure, though, of course, other assemblies in the closed or open flow path may also be cooled.

The exhaust gases 13 from the second turbine 5 are divided into two part streams 14, 15, the quantities of which are determined in each particular instance, essentially depending on the cooling air streams 20, 30 of these exhaust gases 13 and on the degrees of recuperation sought after in the subsequent heat exchange processes. Greater division of the exhaust gas stream 13 is also possible. A first exhaust gas part stream 14 flows through a recuperator 26 which is acted upon by one part of the finally compressed air 21. The heat-treated compressed air 22 flows as a compressed air stream 7 for operating the HP combustion chamber 2. The second part stream 15 flows through a steam generator 27 and produces high-grade steam 16 there by the heat exchange process. This steam can be used in many ways: in a preferred variant, this steam 16 is admixed with the air 22 heat-treated in the recuperator. The exhaust gas, the heat of which has been utilized, both from the recuperator 26 and from the steam generator 27 flows off as flue gas 28, 29.

This division makes it possible for the exhaust gases to be optimally cooled to good effect, irrespective of their properties, thus ensuring maximized efficiency. Moreover, dividing the exhaust gases and allocating them quantitatively makes it possible to pick up the various parameters of the gas turbogenerator set in a controlled manner, with the result that the ultimate purpose can always be achieved. The circuit can be designed more efficiently if it is supplemented by intermediate cooling with regard to the compressor unit, this cooling being such that approximately isothermal compression is achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a gas turbogenerator set, said gas turbogenerator set comprising a compressor unit, at least one combustion chamber, at least one gas turbine and one generator, said method comprising the steps of: operating the gas turbogenerator set to produce an exhaust gas stream; dividing the exhaust gas stream from the turbine into at least two part streams routed in parallel; directing a first part stream of said two part streams to flow through a recuperator, directing a second part stream of said two part streams to flow through a steam generator, thereby generating high-grade superheated steam in said steam generator; conducting compressed combustion air through a secondary flow path of said recuperator and introducing the steam obtained from the steam generator downstream from the recuperator secondary flow path into the compressed combustion air which has previously been heat treated in the recuperator.

2. The method as claimed in claim 1, further comprising the step of operating the compressor unit with at least one intercooler.

3. The method as claimed in claim 1 further comprising the step of operating the gas turbogenerator set with sequential firing.

* * * * *